(12) United States Patent
Liao

(10) Patent No.: US 10,469,001 B1
(45) Date of Patent: Nov. 5, 2019

(54) DC BRUSHLESS CEILING FAN SPEED CONTROL DEVICE AND METHOD

(71) Applicant: Rhine Electronic Co., Ltd., Taichung (TW)

(72) Inventor: Yin Sheng Liao, Taichung (TW)

(73) Assignee: RHINE ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 16/129,214

(22) Filed: Sep. 12, 2018

(30) Foreign Application Priority Data

Aug. 27, 2018 (TW) .............................. 107129830 A

(51) Int. Cl.
*H02P 6/08* (2016.01)
*F04D 25/08* (2006.01)

(52) U.S. Cl.
CPC .............. *H02P 6/08* (2013.01); *F04D 25/088* (2013.01)

(58) Field of Classification Search
CPC ........................................................ H02P 6/08
USPC ............................................ 318/400.01, 700
See application file for complete search history.

(56) References Cited

U.S. PATENT DOCUMENTS

| 7,196,485 B1* | 3/2007 | Lee | F24F 7/007 |
| | | | 318/400.38 |
| 7,714,528 B2* | 5/2010 | Chen | H02P 7/285 |
| | | | 318/400.01 |
| 7,805,063 B2* | 9/2010 | Peng | H02P 6/16 |
| | | | 318/400.01 |

* cited by examiner

*Primary Examiner* — David Luo
(74) *Attorney, Agent, or Firm* — Sinorica, LLC

(57) ABSTRACT

In a DC brushless ceiling fan speed control device and method, the control device includes a switch module having a switch body, a power supply connected to a side of the switch body, and first, second, and third wire connecting members connected to the other side of the switch body. The second and third wire connecting members have a forward diode and a reverse diode respectively, and the switch body is provided for controlling the input of a power supply to directly and electrically supply power to the first wire connecting member, or supply power to the second and third wire connecting members through the forward and reverse diodes. When current is inputted, the waveform signal will be different, and this phenomenon is used for controlling the rotating speed of a ceiling fan to achieve the effects of good safety and convenience.

7 Claims, 6 Drawing Sheets

Prior Art

DC BRUSHLESS CEILING FAN SPEED CONTROL DEVICE AND METHOD

FIELD OF THE INVENTION

The present invention relates to a DC brushless ceiling fan speed control device and its control method, and more particularly to the device and method for controlling the rotating speed of a ceiling fan.

BACKGROUND OF THE INVENTION

With reference to FIG. 6 for a conventional ceiling fan control structure, the ceiling fan control structure is comprised of a control circuit board 20 and a ceiling-fan brushless motor 30, and the control circuit board 20 has a microcontroller unit 23, a control switch 27 and a remote control receiving unit 28, and the remote control receiving unit 28 has a wireless receiver 280, wherein the control switch 27 or the remote control receiving unit 28 is operated to control the microcontroller unit 23 to change the rotating speed of a ceiling-fan brushless motor 30, and the control switch 27 includes a stop gear position contact and a gear changing position contact (not shown in the figure). When the control switch 27 is situated at a stop gear position, only the operation of the ceiling-fan brushless motor 30 is stopped, but the control switch 27 is still situated at an electrically connected status to continue inputting power, and such continual supply of power will consume or waste energy unnecessarily or create an unsafe factor to the ceiling-fan brushless motor 30. In addition, the remote control receiving unit 28 further includes a wireless receiver 280 for receiving a control signal, and the remote control receiving unit 28 transmits the control signal to the microcontroller unit 23, and the conventional ceiling fan control structure must be a whole and the selection or use of a single function cannot be performed individually. Obviously, the use of such structure is inconvenient and the conventional devices and method require further improvements.

SUMMARY OF THE INVENTION

In view of the aforementioned drawbacks of the conventional ceiling fan control structure including unnecessary waste of energy, insufficient safety, and poor application, the inventor of the present invention based on years of experience in the related industry to conduct extensive research and experiment, and finally designed and developed a DC brushless ceiling fan speed control device and its operation method in accordance with the present invention to overcome the drawbacks of the prior art.

Therefore, it is a primary objective of the present invention to provide a DC brushless ceiling fan speed control device and its method, comprising: a switch module including a switch body, a power supply coupled to a side of the switch body, and a first wire connecting member, a second wire connecting member and a third wire connecting member conducted and coupled to the other side of the switch body, and the second wire connecting member having a forward diode, and the third wire connecting member having a reverse diode, and the first wire connecting member, second wire connecting member and third wire connecting member being conducted and coupled to an output contact, and the output contact having an output wire conducted and coupled thereto, wherein the current inputted directly into the first wire connecting member from the power supply by the switch body and then outputted is a sine wave, and the current inputted into the second wire connecting member through the forward diode and then outputted is a positive half cycle, and the current passing through the third wire connecting member and outputted from the reverse diode is a negative half cycle, wherein a waveform signal varies when the current is outputted, so as to selectively determine and control the rotating speed of a ceiling fan.

The switch module may be a pull switch, a wall switch or a remote control switch. When the switch module is a pull switch, the switch body has a high-gear-position contact, a mid-gear-position contact, a low-gear-position contact and a power-off gear-position contact, and the high-gear-position contact is conduced and coupled with the first wire connecting member, and the mid-gear-position contact is conducted and coupled to the second wire connecting member, and the low-gear-position contact is conducted and coupled to the third wire connecting member, and the power-off gear-position contact is conducted and coupled to the switch body, and the first wire connecting member, second wire connecting member and third wire connecting member are conducted and coupled to a control panel, and the control panel is further conducted and coupled to a ceiling-fan brushless motor, and the control panel comprises a first detector, a second detector, a microcontroller unit, a motor driving unit, a forward/reverse rotation switch and a power supply unit, and a side of the first detector, second detector and power supply unit is conducted and coupled to an output wire disposed at an output contact of the switch module, and the other side of the first detector and second detector and the forward/reverse rotation switch is conducted and coupled to the microcontroller unit, and the microcontroller unit is conducted and coupled to the motor driving unit, and the motor driving unit is conducted and coupled to a ceiling-fan brushless motor. The current inputted from the power supply directly into the first wire connecting member by turning the switch body of the pull switch and then outputted is a sine wave, and the current inputted into the second wire connecting member through the forward diode and then outputted is a positive half cycle, and the current inputted into the third wire connecting member through the reverse diode and outputted is a negative half cycle, and there will be no output of current when the power-off gear-position contact is conducted and coupled to the switch body, and the first detector and second detector are provided for detecting the current inputted from the power supply, and a difference of the waveform signal of the outputted signal is used for determination to transmit the detected signal to the microcontroller unit for a conversion of the high, mid, and low control signals, and to transmit the control signal to the motor driving unit, and the motor driving unit controls the rotating speed of the ceiling-fan brushless motor; and a forward/reverse rotation switch transmits a forward/reverse rotation control signal to the motor driving unit, and the motor driving unit controls the forward or reverse rotation of the brushless motor, and the power supply unit converts the input voltage into a direct current and a low-voltage direct current, so as to supply electric power to the microcontroller unit and the motor driving unit. When the switch module is a wall switch, the switch body has a high-gear-position contact, a mid-gear-position contact, a low-gear-position contact and a power-off gear-position contact, and the high-gear-position contact is conducted and coupled to the first wire connecting member, and the mid-gear-position contact is conducted and coupled to the second wire connecting member, and the low-gear-position contact is conducted and coupled to the third wire connecting member, and the power-off gear-position contact is conducted and coupled to the switch body, and the first wire connecting member, second wire connecting member and third wire connecting member are conducted and coupled to a control panel, and the control panel is further conducted and coupled to a ceiling-fan brushless motor, and the control panel is installed onto the ceiling-fan brushless motor. When the switch body is a wall switch, the current inputted directly from the power supply into the first wire connecting contact by turning the switch body of the wall switch and then outputted is a sine wave, and the current inputted into the second wire connecting member through the forward diode and then outputted is a positive half cycle, and the current inputted into the third wire connecting member through the reverse diode and then outputted is a negative half cycle, and there is no current outputted when the power-off gear-position contact is conducted and coupled to the switch body, and a difference of the waveform signal of the outputted current is used for determination to selectively determine and control the rotating speed of a ceiling fan. The wall switch can control a plurality of ceiling-fan brushless motors simultaneously. If the switch body is situated at the power-off gear-position contact, then there will be no input of current, and thus preventing unnecessary power consumption and any risk caused by supplying power supply in a non-operating status.

When the switch module is a remote control switch, the switch module comprises a microcontroller unit and a remote control receiving unit, and the microcontroller unit has a first relay, a second relay and a third relay, and the remote control receiving unit has a wireless receiver coupled to the microcontroller unit and the remote control receiving unit, and the power supply is coupled to the microcontroller unit and the remote control receiving unit, and the microcontroller unit is coupled to the first relay, second relay and third relay, and the first relay, second relay and third relay are further coupled to the first wire connecting member, second wire connecting member and third wire connecting member respectively, and an outputted wire of the output contact is coupled to a control panel, and the control panel is installed onto the ceiling-fan brushless motor. After the power supply inputs current upon receiving a signal through the remote control receiving unit and transmitting the signal to the microcontroller unit, the current inputted directly from the first relay into the first wire connecting member and then outputted is a sine wave, and the current inputted from the second relay into the second wire connecting member through the forward diode and then outputted is a positive half cycle, and the current inputted from the third relay into the third wire connecting member through the reverse diode and then outputted is a negative half cycle, and a difference of the waveform signal of the outputted current is used for determination to control the high, mid, and low rotating speed of the ceiling-fan brushless motor.

With the aforementioned arrangement, the switch module of the present invention may be applied to the pull switch, wall switch or remote control switch to prevent unnecessary power consumption after the switch module is disconnected and safety issue, so as to achieve the effects of providing good convenience and safety and saving energy.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
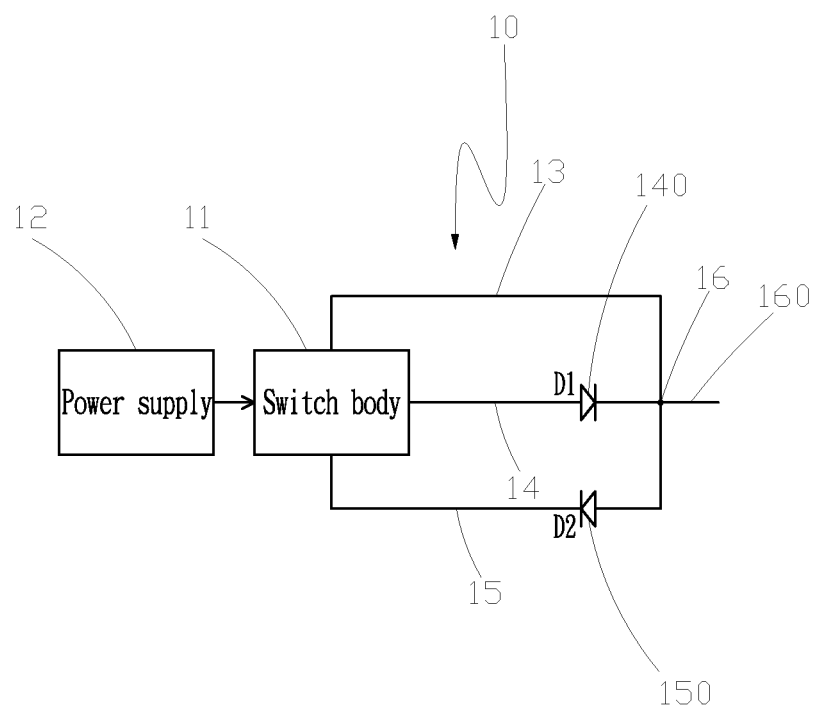
FIG. 1 is a schematic circuit block diagram of a DC brushless ceiling fan speed control device in accordance with the present invention.

With reference to FIG. 1 for a schematic circuit block diagram of a DC brushless ceiling fan speed control device in accordance with the present invention, the DC brushless ceiling fan speed control device comprises:

a switch module 10, including a switch body 11, a power supply 12 coupled to a side of the switch body 11, and a first wire connecting member 13, a second wire connecting member 14 and a third wire connecting member 15 coupled to the other side of the switch body 11, and the second wire connecting member 14 having a forward diode 140, and the third wire connecting member 15 having a reverse diode 150, and the first wire connecting member 13, second wire connecting member 14 and third wire connecting member 15 being coupled to an output contact 16, and the output contact 16 being coupled to an output wire 160, wherein the current is inputted directly into the first wire connecting member 13 from the power supply 12 and selected and controlled by the switch body 11 and then outputted, or the current is inputted from the second wire connecting member 14 through the forward diode 140 and then outputted, or the current is inputted from the third wire connecting member 15 through the reverse diode 150 and then outputted. In the aforementioned three cases of inputting the current and then outputting the current, their waveform signals are different and such difference may be used for selecting and controlling the rotating speed of a ceiling fan.

Figure 2:
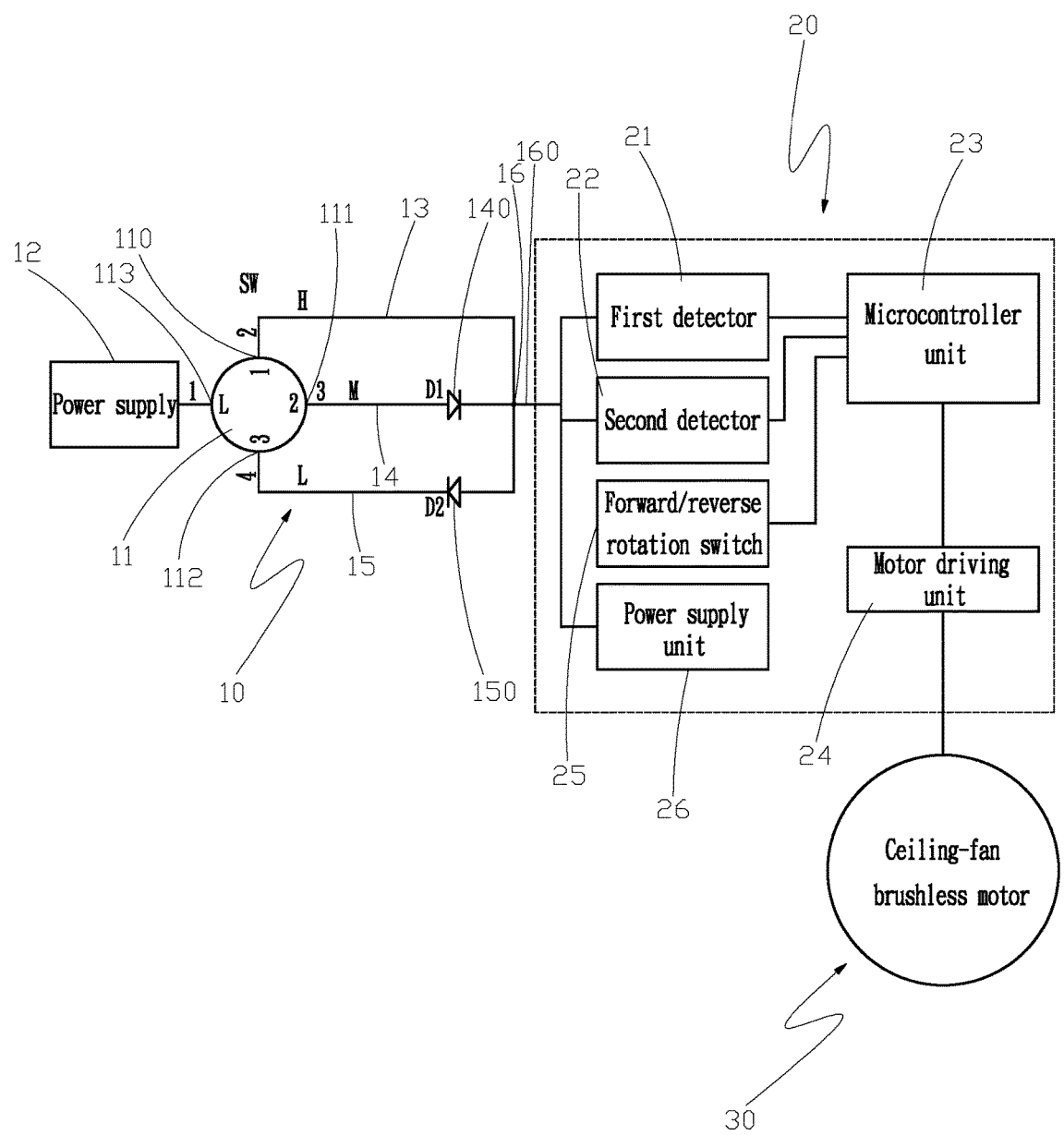
FIG. 2 is a schematic circuit block diagram of a DC brushless ceiling fan speed control device applied to a pull switch module in accordance with the present invention.
Figure 3:
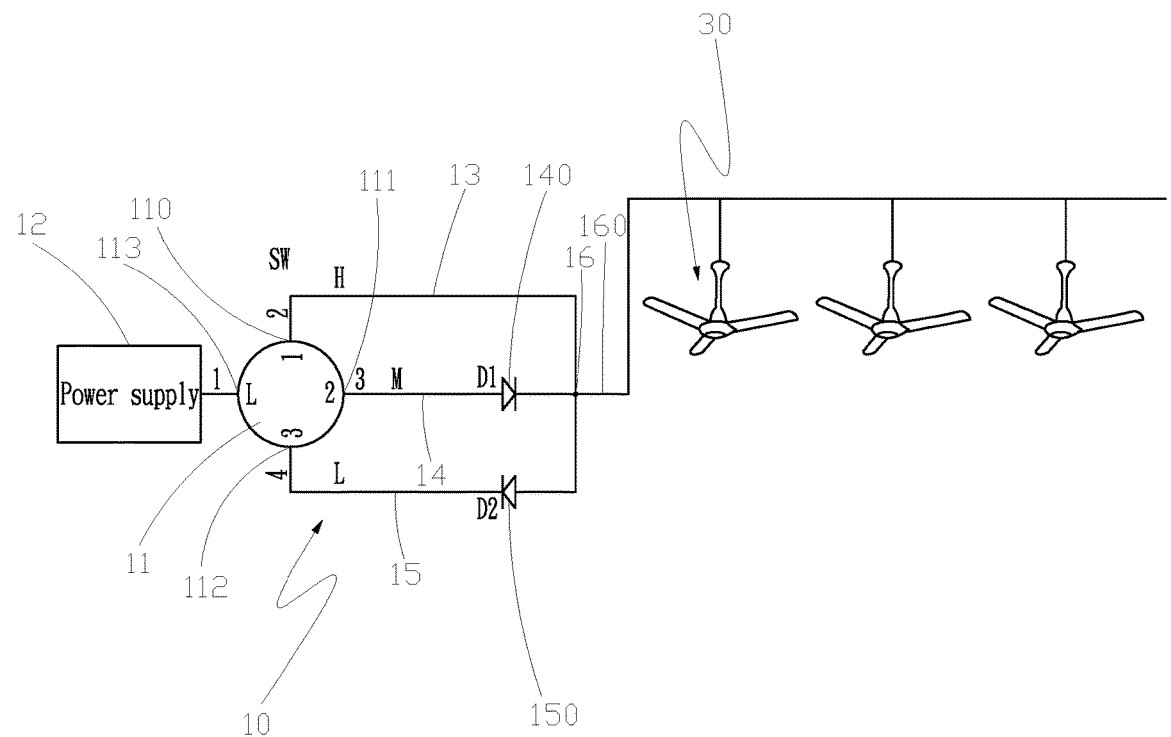
FIG. 3 is a schematic circuit block diagram of a DC brushless ceiling fan speed control device applied to a wall switch module in accordance with the present invention.

With reference to FIGS. 2 and 3 for the schematic circuit diagram of a DC brushless ceiling fan speed control device applied to a pull switch module and a wall switch module in accordance with the present invention respectively, the switch module 10 may be a pull switch, a wall switch or a remote control switch. When the switch module 10 is the pull switch or wall switch, the switch body 11 includes a high-gear-position contact 110, a mid-gear-position contact 111, a low-gear-position contact 112 and a power-off gear-position contact 113, and the high-gear-position contact 110 is conducted and coupled to the first wire connecting member 13, and the mid-gear-position contact 111 is conducted and coupled to the second wire connecting member 14, and the low-gear-position contact 112 is conducted and coupled to the third wire connecting member 15, and the power-off gear-position contact 113 is conducted and coupled to the switch body 11, and the first wire connecting member 13, second wire connecting member 14 and third wire connecting member 15 are is conducted and coupled to a control panel 20, and the control panel 20 is further conducted and coupled to a ceiling-fan brushless motor 30, and the control panel 20 may be installed independently or installed onto the ceiling-fan brushless motor 30, and the control panel 20 comprises a first detector 21, a second detector 22, a microcontroller unit 23, a motor driving unit 24, a forward/reverse rotation switch 25 and a power supply unit 26, and a side of the first detector 21, second detector 22 and power supply unit 26 is coupled to an output wire of the output contact 16 of the switch module 10, and the other side of the first detector 21 and second detector 22 and forward/reverse rotation switch 25 is coupled to the microcontroller unit 23, and the microcontroller unit 23 is coupled to the motor driving unit 24, and the motor driving unit 24 is coupled to a ceiling-fan brushless motor 30. If the switch body 11 is turned, current will be inputted into the power-off gear-position contact 113, or directly into the first wire connecting member 13 and then outputted, or inputted from the second wire connecting member 14 through the forward diode 140 and then outputted, or inputted from the third wire connecting member 15 through the reverse diode 150 and then outputted. Further, the inputted current is detected and determined by the first detector 21 and second detector 22, and a detected signal is transmitted to the microcontroller unit 23, and the microcontroller unit 23 will transmit a high, mid, or low control signal to the motor driving unit 24, and the motor driving unit 24 controls the rotating speed of the brushless motor 30, and the forward/reverse rotation switch 25 transmits a forward/reverse rotation control signal to the motor driving unit 24, and the motor driving unit 24 controls the forward/reverse rotation of the brushless motor 30, and the power supply unit 26 converts the input voltage into a DC and a low voltage DC for supplying the electric power to the microcontroller unit 23 and the motor driving unit 24, so that the wall switch can control a plurality of ceiling-fan brushless motors 30 simultaneously. If the switch body 11 is situated at the power-off gear-position contact 113, then there will be no input of current, so as to prevent unnecessary power consumption and any risk caused by supplying power supply in a non-operating status.

Figure 4:
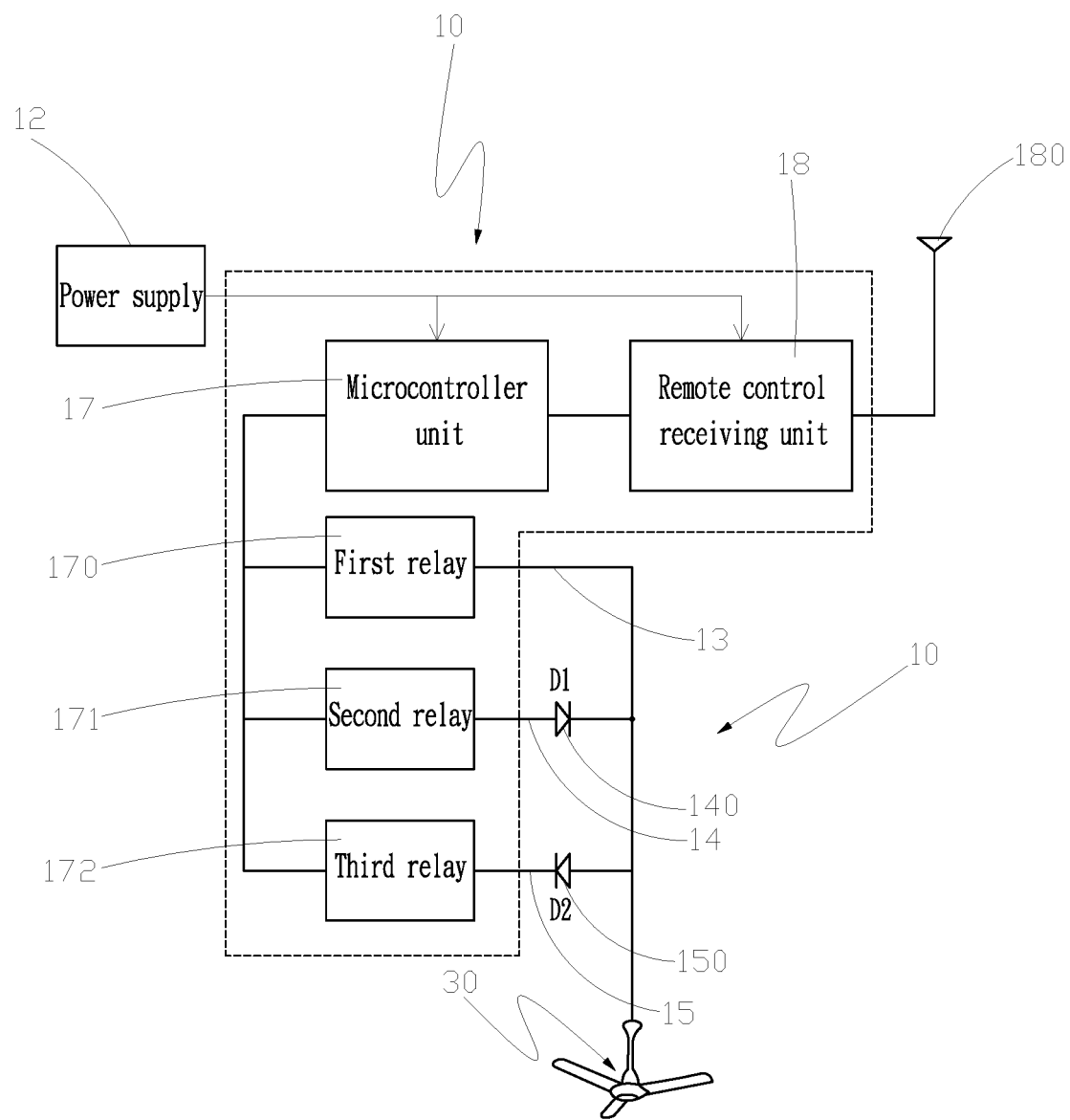
FIG. 4 is a schematic circuit block diagram of a DC brushless ceiling fan speed control device applied to a remote switch module in accordance with the present invention.

With reference to FIG. 4 for a DC brushless ceiling fan speed control device applied to a remote control switch module in accordance with the present invention, the switch module 10 may be a pull switch, a wall switch or a remote control switch. For the switch module 10 which is a remote control switch, the switch module 10 has a microcontroller unit 17 and a remote control receiving unit 18, and the microcontroller unit 17 includes a first relay 170, a second relay 171 and a third relay 172, and the remote control receiving unit 18 has a wireless receiver 180, wherein the microcontroller unit 17 is coupled to the remote control receiving unit 18, and the power supply 12 is coupled to the microcontroller unit 17 and the remote control receiving unit 18, and the microcontroller unit 17 is coupled to the first relay 170, second relay 171 and third relay 172, and the first relay 170, second relay 171 and third relay 172 are further coupled to the first wire connecting member 13, second wire connecting member 14 and third wire connecting member 15 respectively, and an output contact 16 of the output wire 160 is coupled to the ceiling-fan brushless motor 30, and the ceiling-fan brushless motor 30 has a control panel 20 (not shown in the figure) installed thereon. After a current is inputted from the power supply 12, the remote control receiving unit 18 receives a signal and transmits the signal to the microcontroller unit 17, the current is inputted directly from the first relay 170, or inputted from the second relay 171 through the forward diode 140, or inputted from the third relay 172 through the reverse diode 150, and a high, mid, or low control signal is transmitted to the control panel 20 of the ceiling-fan brushless motor 30 to control the rotating speed of the DC brushless ceiling fan.

Figure 5:
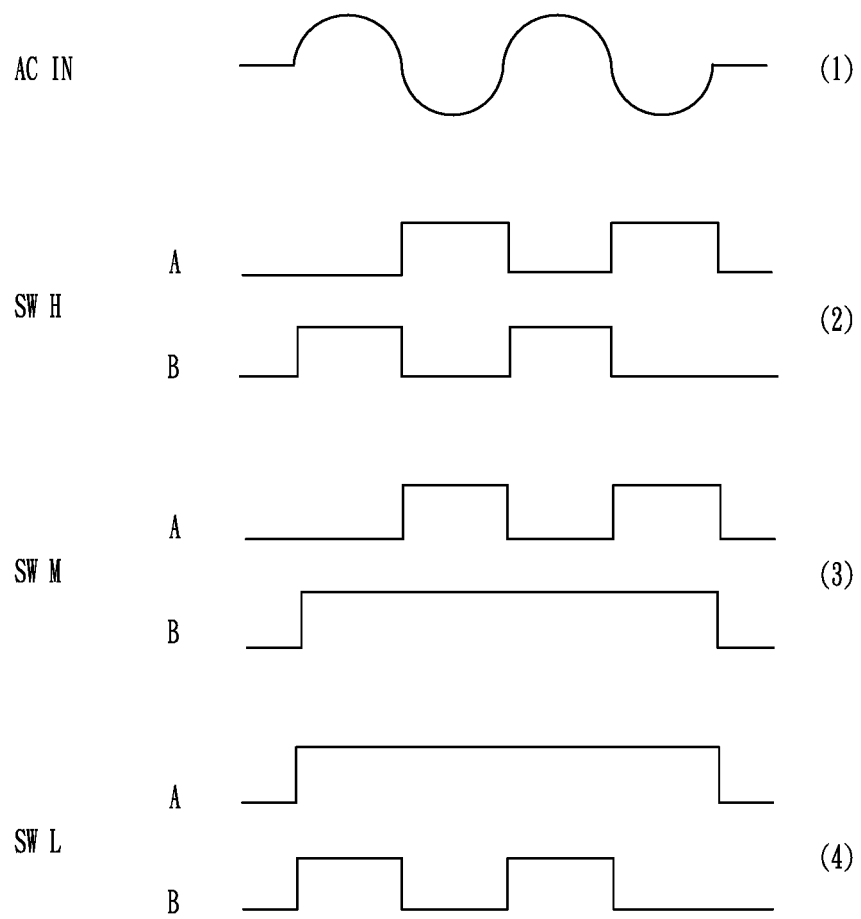
FIG. 5 is a waveform chart of a power supply that inputs current to a DC brushless ceiling fan speed control device through first, second and third wire connecting members and forward and reverse diodes in accordance with the present invention.
Figure 6:
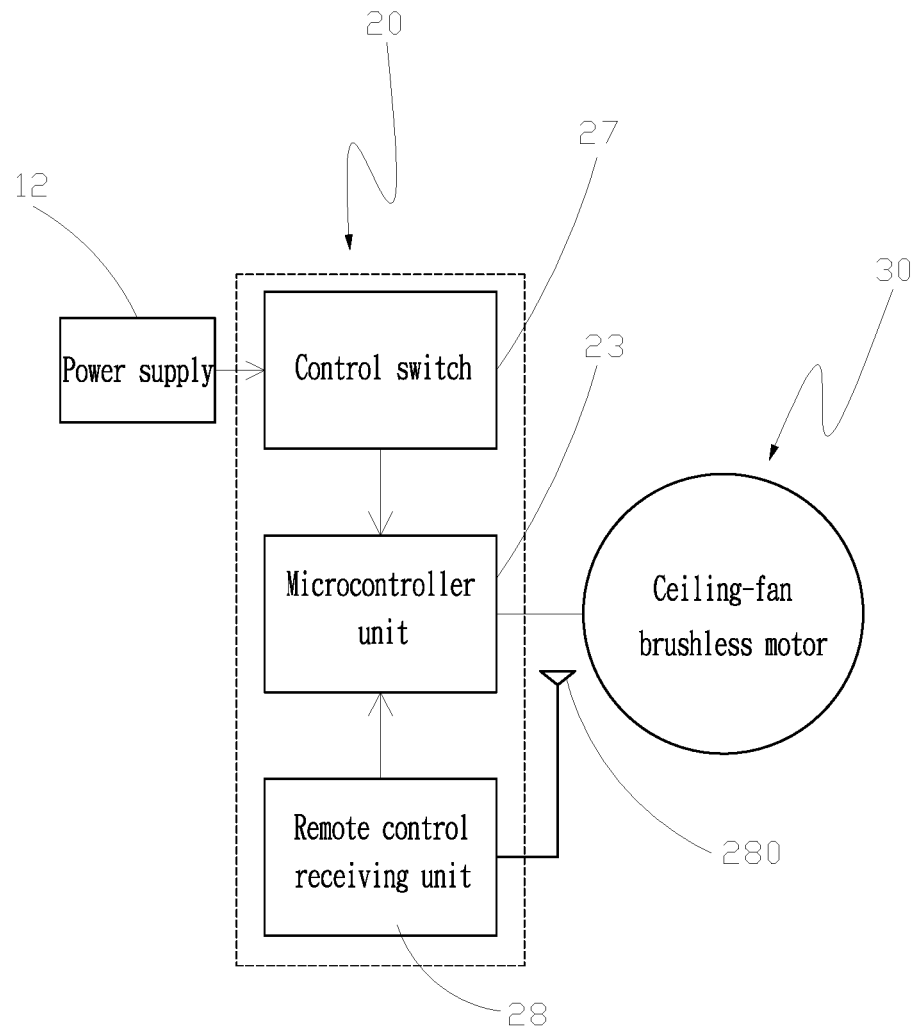
FIG. 6 is a schematic block diagram of a conventional DC brushless ceiling fan speed control device.

With reference to FIGS. 2 to 5 for the schematic circuit block diagrams of a DC brushless ceiling fan speed control device and method applied to a pull switch module, a wall switch module and a remote switch module in accordance with the present invention respectively and a waveform chart of the currents inputted from the power supply through the first, second and third wire connecting members and the forward diode and reverse diode respectively, the switch body 11 is turned or controlled remotely, so that the current inputted from the power supply 12 into the first wire connecting member 13 is a sine wave as shown in FIG. 5(1), or the current inputted into the second wire connecting member 14 through the forward diode 140 and then outputted is a positive half cycle as shown in FIG. 5(2), or the current inputted into the third wire connecting member 15 through the reverse diode 150 and then outputted is a negative half cycle as shown in FIG. 5(3), or the current inputted from the power supply 12 into the power-off gear-position contact 113 of the switch body 11 is in a non-conducted status as shown in FIG. 5(4). The waveform signal of the outputted current is different, and such difference can be used for selecting and controlling the rotating speed of the ceiling fan, and the switch module 10 can be applied to the pull switch, wall switch or remote control switch at the same time. When the switch body 11 is situated at the power-off gear-position contact 113, then there will be no output of current to prevent unnecessary power consumption and any risk caused by supplying power supply in a non-operating status, so as to achieve the effects of saving energy and providing high safety.

With the aforementioned structures, a DC brushless ceiling fan speed control device of the present invention and method are achieved.

In summation of the description above, the present invention are novel, useful, non-obvious, and inventive and comply with the patent application requirements, and thus the disclosure is duly filed for patent application.

While the present invention has been described by means of specific embodiments, numerous modifications and variations could be made thereto by those skilled in the art without departing from the scope and spirit of the present invention set forth in the claims.

What is claimed is:

1. A DC brushless ceiling fan speed control device, comprising:
   a switch module, including a switch body, a power supply coupled to a side of the switch body, and a first wire connecting member, a second wire connecting member and a third wire connecting member conducted and coupled to the other side of the switch body, and the second wire connecting member having a forward diode, and the third wire connecting member having a reverse diode, and the first wire connecting member, second wire connecting member and third wire connecting member being conducted and coupled to an output contact, and the output contact having an output wire conducted and coupled thereto; and
   the current inputted directly into the first wire connecting member from the power supply by the switch body and then outputted is a sine wave, and the current inputted into the second wire connecting member through the forward diode and then outputted is a positive half cycle, and the current passing through the third wire connecting member and outputted from the reverse diode is a negative half cycle, wherein a waveform signal varies when the current is outputted, so as to selectively determine and control the rotating speed of a ceiling fan.

2. The DC brushless ceiling fan speed control device of claim 1, wherein the switch module is a pull switch, and the switch body has a high-gear-position contact, a mid-gear-position contact, a low-gear-position contact and a power-off gear-position contact, and the high-gear-position contact is conduced and coupled with the first wire connecting member, and the mid-gear-position contact is conducted and coupled to the second wire connecting member, and the low-gear-position contact is conducted and coupled to the third wire connecting member, and the power-off gear-position contact is conducted and coupled to the switch body, and the first wire connecting member, second wire connecting member and third wire connecting member are conducted and coupled to a control panel, and the control panel is further conducted and coupled to a ceiling-fan brushless motor, and the control panel comprises a first detector, a second detector, a microcontroller unit, a motor driving unit, a forward/reverse rotation switch and a power supply unit, and a side of the first detector, second detector and power supply unit is conducted and coupled to an output wire disposed at an output contact of the switch module, and the other side of the first detector and second detector and the forward/reverse rotation switch is conducted and coupled to the microcontroller unit, and the microcontroller unit is conducted and coupled to the motor driving unit, and the motor driving unit is conducted and coupled to a ceiling-fan brushless motor.

3. A control method of the DC brushless ceiling fan speed control device according to claim 2, wherein the current inputted from the power supply directly into the first wire connecting member by turning the switch body of the pull switch and then outputted is a sine wave, and the current inputted into the second wire connecting member through the forward diode and then outputted is a positive half cycle, and the current inputted into the third wire connecting member through the reverse diode and outputted is a negative half cycle, and there will be no output of current when the power-off gear-position contact is conducted and coupled to the switch body, and the first detector and second detector are provided for detecting the current inputted from the power supply, and a difference of the waveform signal of the outputted signal is used for determination to transmit the detected signal to the microcontroller unit for a conversion of the high, mid, and low control signals, and to transmit the control signal to the motor driving unit, and the motor driving unit controls the rotating speed of the ceiling-fan brushless motor; and a forward/reverse rotation switch transmits a forward/reverse rotation control signal to the motor driving unit, and the motor driving unit controls the forward or reverse rotation of the brushless motor, and the power supply unit converts the input voltage into a direct current and a low-voltage direct current, so as to supply electric power to the microcontroller unit and the motor driving unit.

4. The DC brushless ceiling fan speed control device of claim 1, wherein the switch module is a wall switch, and the switch body has a high-gear-position contact, a mid-gear-position contact, a low-gear-position contact and a power-off gear-position contact, and the high-gear-position contact is conducted and coupled to the first wire connecting member, and the mid-gear-position contact is conducted and coupled to the second wire connecting member, and the low-gear-position contact is conducted and coupled to the third wire connecting member, and the power-off gear-position contact is conducted and coupled to the switch body, and the first wire connecting member, second wire connecting member and third wire connecting member are conducted and coupled to a control panel, and the control panel is further conducted and coupled to a ceiling-fan brushless motor, and the control panel is installed onto the ceiling-fan brushless motor.

5. A control method of the DC brushless ceiling fan speed control device according to claim 4, characterized in that the current inputted directly from the power supply into the first wire connecting contact by turning the switch body of the wall switch and then outputted is a sine wave, and the current inputted into the second wire connecting member through the forward diode and then outputted is a positive half cycle, and the current inputted into the third wire connecting member through the reverse diode and then outputted is a negative half cycle, and there is no current outputted when the power-off gear-position contact is conducted and coupled to the switch body, and a difference of the waveform signal of the outputted current is used for determination to selectively determine and control the rotating speed of a ceiling fan.

6. The DC brushless ceiling fan speed control device of claim 1, wherein the switch module is a remote control switch, and the switch module comprises a microcontroller unit and a remote control receiving unit, and the microcontroller unit comprises a first relay, a second relay and a third relay, and the remote control receiving unit has a wireless receiver coupled to the microcontroller unit and the remote control receiving unit, and the power supply is coupled to the microcontroller unit and the remote control receiving unit, and the microcontroller unit is coupled to the first relay, second relay and third relay, and the first relay, second relay and third relay are further coupled to the first wire connecting member, second wire connecting member and third wire connecting member respectively, and an outputted wire of the output contact is coupled to a control panel, and the control panel is installed onto the ceiling-fan brushless motor.

7. A control method of the DC brushless ceiling fan speed control device according to claim 6, characterized in that after the power supply inputs current upon receiving a signal through the remote control receiving unit and transmitting the signal to the microcontroller unit, the current inputted directly from the first relay into the first wire connecting member and then outputted is a sine wave, and the current inputted from the second relay into the second wire connecting member through the forward diode and then outputted is a positive half cycle, and the current inputted from the third relay into the third wire connecting member through the reverse diode and then outputted is a negative half cycle, and a difference of the waveform signal of the outputted current is used for determination to control the high, mid, and low rotating speed of the ceiling-fan brushless motor.

* * * * *